US008922347B1

(12) United States Patent
de Rochemont (10) Patent No.: US 8,922,347 B1
(45) Date of Patent: Dec. 30, 2014

(54) R.F. ENERGY COLLECTION CIRCUIT FOR WIRELESS DEVICES

(76) Inventor: L. Pierre de Rochemont, Austin, TX (US)

( * ) Notice: Subject to any disclaimer, the term of this patent is extended or adjusted under 35 U.S.C. 154(b) by 233 days.

(21) Appl. No.: 12/818,025

(22) Filed: Jun. 17, 2010

Related U.S. Application Data (60) Provisional application No. 61/187,687, filed on Jun. 17, 2009.

(51) Int. Cl.
*H04Q 5/22* (2006.01)
*H01Q 9/26* (2006.01)

(52) U.S. Cl.
USPC .......................................... 340/10.4; 343/803

(58) Field of Classification Search
CPC .......... G06K 19/0723; G06K 19/0707; G06K 19/0775; G06K 19/07767; H01L 2223/6677; H01L 21/4807; H02J 17/00
USPC ................. 340/10.1–10.4; 343/803
See application file for complete search history.

(56) References Cited

U.S. PATENT DOCUMENTS

| | | | |
|---|---|---|---|
| 2,283,925 A | 5/1942 | Harvey | |
| 2,886,529 A | 5/1959 | Louis | |
| 3,574,114 A | 4/1971 | Monforte | |
| 3,614,554 A | 10/1971 | Shield et al. | |
| 3,983,077 A | 9/1976 | Fuller et al. | |
| 4,400,683 A | 8/1983 | Eda et al. | |
| 4,455,545 A | 6/1984 | Shelly | |
| 4,523,170 A | 6/1985 | Huth, III | |
| 4,646,038 A | 2/1987 | Wanat | |
| 4,759,120 A | 7/1988 | Bernstein | |
| 4,859,492 A | 8/1989 | Rogers, Jr. et al. | |
| 4,880,770 A | 11/1989 | Mir et al. | |
| 4,967,201 A | 10/1990 | Rich, III | |
| 5,084,749 A | 1/1992 | Losee et al. | |
| 5,130,675 A | 7/1992 | Sugawara | |
| 5,139,999 A | 8/1992 | Gordan et al. | |
| 5,154,973 A | 10/1992 | Imagawa et al. | |
| 5,198,824 A | 3/1993 | Poradish | |
| 5,217,754 A | 6/1993 | Santiago-Aviles et al. | |
| 5,219,377 A | 6/1993 | Poradish | |

(Continued)

FOREIGN PATENT DOCUMENTS

| | | |
|---|---|---|
| EP | 0026056 A1 | 4/1981 |
| EP | 0939451 A1 | 1/1999 |
| EP | 1376759 A2 | 2/2004 |
| GB | 1125897 A | 9/1968 |

OTHER PUBLICATIONS

GigaCircuits, "The Wireless Revolution Continues . . . ", Jul. 19, 2006, http://www.gigacircuits.com.*

(Continued)

*Primary Examiner* — Benjamin C Lee
*Assistant Examiner* — Adam Carlson
(74) *Attorney, Agent, or Firm* — Burns & Levinson LLP; Jacob N. Erlich; David W. Gomes (57) ABSTRACT

An R.F. energy collection circuit, provides a low-loss R.F. front end tuned to minimize lost power in R.F. bands commonly used for communications for passing substantially coherent R.F. signals received therefrom, a rectifier circuit coupled to receive coherent R.F. energy from the front end, and an energy storage circuit coupled to receive energy from the rectifier circuit.

10 Claims, 6 Drawing Sheets

(56) References Cited

U.S. PATENT DOCUMENTS

| | | |
|---|---|---|
| 5,263,198 A | 11/1993 | Geddes et al. |
| 5,272,485 A | 12/1993 | Mason et al. |
| 5,403,797 A | 4/1995 | Ohtani et al. |
| 5,427,988 A | 6/1995 | Sengupta et al. |
| 5,456,945 A | 10/1995 | McMillan et al. |
| 5,478,610 A | 12/1995 | Desu et al. |
| 5,513,382 A | 4/1996 | Agahi-Kesheh et al. |
| 5,535,445 A | 7/1996 | Gunton |
| 5,540,772 A | 7/1996 | McMillan et al. |
| 5,543,773 A | 8/1996 | Evans et al. |
| 5,584,053 A | 12/1996 | Kommrusch et al. |
| 5,590,387 A | 12/1996 | Schmidt et al. |
| 5,614,252 A | 3/1997 | McMillan et al. |
| 5,625,365 A | 4/1997 | Tom et al. |
| 5,635,433 A | 6/1997 | Sengupta |
| 5,707,459 A | 1/1998 | Itoyama et al. |
| 5,707,715 A | 1/1998 | deRochemont et al. |
| 5,747,870 A | 5/1998 | Pedder |
| 5,759,923 A | 6/1998 | McMillan et al. |
| 5,764,189 A | 6/1998 | Lohninger |
| 5,771,567 A | 6/1998 | Pierce et al. |
| 5,854,608 A | 12/1998 | Leisten |
| 5,859,621 A | 1/1999 | Leisten |
| 5,888,583 A | 3/1999 | McMillan et al. |
| 5,889,459 A | 3/1999 | Hattori et al. |
| 5,892,489 A | 4/1999 | Kanba et al. |
| 5,903,421 A | 5/1999 | Furutani et al. |
| 5,933,121 A | 8/1999 | Rainhart et al. |
| 5,945,963 A | 8/1999 | Leisten |
| 6,023,251 A | 2/2000 | Koo et al. |
| 6,027,826 A | 2/2000 | deRochemont |
| 6,028,568 A | 2/2000 | Asakura et al. |
| 6,031,445 A | 2/2000 | Marty et al. |
| 6,040,805 A | 3/2000 | Huynh et al. |
| 6,046,707 A | 4/2000 | Gaughan et al. |
| 6,052,040 A | 4/2000 | Hino |
| 6,111,544 A | 8/2000 | Dakeya et al. |
| 6,143,432 A | 11/2000 | deRochemont et al. |
| 6,154,176 A | 11/2000 | Fathy et al. |
| 6,157,321 A * | 12/2000 | Ricci ........................... 340/902 |
| 6,176,004 B1 | 1/2001 | Rainhart et al. |
| 6,181,297 B1 | 1/2001 | Leisten |
| 6,188,368 B1 | 2/2001 | Koriyama et al. |
| 6,195,049 B1 | 2/2001 | Kim et al. |
| 6,204,203 B1 | 3/2001 | Narwankar et al. |
| 6,208,843 B1 | 3/2001 | Huang et al. |
| 6,222,489 B1 | 4/2001 | Tsuru et al. |
| 6,266,020 B1 | 7/2001 | Chang |
| 6,271,803 B1 | 8/2001 | Watanabe et al. |
| 6,300,894 B1 | 10/2001 | Lynch et al. |
| 6,320,547 B1 | 11/2001 | Fathy et al. |
| 6,323,549 B1 | 11/2001 | deRochemont et al. |
| 6,492,949 B1 | 12/2002 | Breglia et al. |
| 6,496,149 B1 | 12/2002 | Birnbaum et al. |
| 6,501,415 B1 | 12/2002 | Viana et al. |
| 6,541,820 B1 | 4/2003 | Bol |
| 6,552,693 B1 | 4/2003 | Leisten |
| 6,559,735 B1 | 5/2003 | Hoang et al. |
| 6,583,699 B2 | 6/2003 | Yokoyama |
| 6,605,151 B1 | 8/2003 | Wessels et al. |
| 6,611,419 B1 | 8/2003 | Chakravorty |
| 6,620,750 B2 | 9/2003 | Kim et al. |
| 6,639,556 B2 | 10/2003 | Baba |
| 6,642,908 B2 | 11/2003 | Pleva et al. |
| 6,650,303 B2 | 11/2003 | Kim et al. |
| 6,670,497 B2 | 12/2003 | Tashino et al. |
| 6,680,700 B2 | 1/2004 | Hilgers |
| 6,683,576 B2 | 1/2004 | Achim |
| 6,686,406 B2 | 2/2004 | Tomomatsu et al. |
| 6,690,336 B1 | 2/2004 | Leisten et al. |
| 6,697,605 B1 | 2/2004 | Atokawa et al. |
| 6,742,249 B2 | 6/2004 | deRochemont et al. |
| 6,743,744 B1 | 6/2004 | Kim et al. |
| 6,762,237 B2 | 7/2004 | Glatkowski et al. |
| 6,791,496 B1 | 9/2004 | Killen et al. |
| 6,864,848 B2 | 3/2005 | Sievenpiper |
| 6,906,674 B2 | 6/2005 | McKinzie, III et al. |
| 6,919,119 B2 | 7/2005 | Kalkan et al. |
| 7,047,637 B2 | 5/2006 | deRochemont et al. |
| 7,405,698 B2 | 7/2008 | deRochemont |
| 7,564,887 B2 | 7/2009 | Wang et al. |
| 7,763,917 B2 | 7/2010 | deRochemont |
| 7,840,305 B2 * | 11/2010 | Behr et al. .................... 700/174 |
| 8,115,448 B2 * | 2/2012 | John ............................ 320/108 |
| 8,237,561 B2 * | 8/2012 | Beigel et al. ............... 340/572.1 |
| 2001/0023779 A1 | 9/2001 | Sugaya et al. |
| 2001/0027119 A1 | 10/2001 | Furutani et al. |
| 2001/0048969 A1 | 12/2001 | Constantino et al. |
| 2002/0039667 A1 | 4/2002 | Takaya et al. |
| 2002/0047768 A1 | 4/2002 | Duffy |
| 2002/0070983 A1 | 6/2002 | Kozub et al. |
| 2002/0092472 A1 | 7/2002 | Hayashi et al. |
| 2002/0110004 A1 | 8/2002 | Parks |
| 2002/0190818 A1 | 12/2002 | Endou et al. |
| 2003/0002045 A1 | 1/2003 | Nemat-Nasser et al. |
| 2003/0034124 A1 | 2/2003 | Sugaya et al. |
| 2003/0073565 A1 | 4/2003 | Ellis et al. |
| 2003/0080325 A1 | 5/2003 | Uchiyama et al. |
| 2003/0107455 A1 | 6/2003 | Imanaka et al. |
| 2003/0111714 A1 | 6/2003 | Bates et al. |
| 2003/0122647 A1 | 7/2003 | Ou |
| 2003/0148024 A1 | 8/2003 | Kodas et al. |
| 2003/0161959 A1 | 8/2003 | Kodas et al. |
| 2003/0170436 A1 | 9/2003 | Sumi et al. |
| 2003/0221621 A1 | 12/2003 | Pokharna et al. |
| 2004/0000964 A1 | 1/2004 | Killen et al. |
| 2004/0000966 A1 | 1/2004 | Killen et al. |
| 2004/0000970 A1 | 1/2004 | Killen et al. |
| 2004/0000972 A1 | 1/2004 | Killen et al. |
| 2004/0000975 A1 | 1/2004 | Killen et al. |
| 2004/0000976 A1 | 1/2004 | Killen et al. |
| 2004/0001024 A1 | 1/2004 | Killen et al. |
| 2004/0001026 A1 | 1/2004 | Killen et al. |
| 2004/0001027 A1 | 1/2004 | Killen et al. |
| 2004/0001028 A1 | 1/2004 | Killen et al. |
| 2004/0012081 A1 | 1/2004 | Kwon |
| 2004/0033654 A1 | 2/2004 | Yamagata |
| 2004/0070915 A1 | 4/2004 | Nagai et al. |
| 2004/0084080 A1 | 5/2004 | Sager et al. |
| 2004/0092236 A1 | 5/2004 | Irie et al. |
| 2004/0113738 A1 | 6/2004 | Ahn et al. |
| 2004/0113790 A1 * | 6/2004 | Hamel et al. ............... 340/572.1 |
| 2004/0118448 A1 | 6/2004 | Scher et al. |
| 2004/0189528 A1 | 9/2004 | Killen et al. |
| 2005/0036269 A1 | 2/2005 | Ma et al. |
| 2005/0051870 A1 | 3/2005 | Yamazaki et al. |
| 2005/0104553 A1 * | 5/2005 | Mickle et al. ................. 320/101 |
| 2006/0086994 A1 | 4/2006 | Viefers et al. |
| 2006/0092079 A1 * | 5/2006 | de Rochemont ....... 343/700 MS |
| 2006/0094425 A1 * | 5/2006 | Mickle et al. ................. 455/434 |
| 2006/0125681 A1 | 6/2006 | Smith et al. |
| 2006/0134491 A1 | 6/2006 | Hilchenko et al. |
| 2007/0003781 A1 | 1/2007 | deRochemont |
| 2007/0137257 A1 | 6/2007 | Desantolo et al. |
| 2007/0139976 A1 | 6/2007 | deRochemont |
| 2007/0166453 A1 | 7/2007 | Van Duren et al. |
| 2007/0170535 A1 | 7/2007 | deRochemont |
| 2007/0259768 A1 | 11/2007 | Kear et al. |
| 2008/0136395 A1 | 6/2008 | Bennett |
| 2008/0186245 A1 * | 8/2008 | Hilgers ........................ 343/803 |
| 2008/0231421 A1 * | 9/2008 | Tuttle .......................... 340/10.1 |
| 2009/0004370 A1 | 1/2009 | Zurcher et al. |
| 2009/0011922 A1 | 1/2009 | deRochemont |
| 2009/0015314 A1 | 1/2009 | Kirchmeier et al. |
| 2011/0021007 A1 | 1/2011 | deRochemont |
| 2011/0049394 A1 | 3/2011 | deRochemont |
| 2011/0065224 A1 | 3/2011 | Bollman et al. |
| 2011/0248900 A1 | 10/2011 | deRochemont |

OTHER PUBLICATIONS

McKinzie III, W.E. et al. Mitigation of Multipath Through the Use of an Artificial Magnetic Conductor for Precision CPS Surveying Antennas. © 2002 IEEE pp. 640-643.

(56) References Cited

OTHER PUBLICATIONS

McKinzie, W. et al. A Multi-Band Artificial Magnetic Conductor Comprised of Multiple FSS Layers. © 2003 IEEE pp. 423-426.

Monorchio, A. et al. Synthesis of Artificial Magnetic Conductors by Using Multilayered Frequency Selective Surfaces. IEEE Antennas and Wireless Propagation Letters vol. 1 2002 pp. 196-199.

Mosallaei, H. et al. Periodic Bandgap and Effective Dielectric Materials in Electromagnetics: Characterization and Applications in Nanocavities and Waveguides. IEEE Transactions on Antennas and Propagation 51(3). Mar. 2003. pp. 549-563.

Pontes, F.M. et al. Study of the dielectric and ferroelectric properties of chemically processed BaxSr1-xTiO3 thin films. Thin Solid Films, vol. 386, No. 1 (2001) 91-98.

Rogers, S. et al. AMCs Comprised of Interdigital Capacitor FSS Layers Enable Lower Cost Applications. © 2003 IEEE pp. 411-414.

Rogers, S. et al. An AMC-Based 802.11a/b Antenna for Laptop Computers. © 2003 IEEE pp. 10-13.

Sievenpiper, D.F. et al. Two-Dimensional Beam Steering Using an Electrically Tunable Impedance Surface. IEEE Transactions on Antennas and Propagation 51(10). Oct. 2003. pp. 2713-2722.

Sun, J. et al. Efficiency of Various Photonic Bandgap (PBG) Structures. $3^{rd}$ Int'l. Conf. on Microwave and Millimeter Wave Technology Proceedings 2002. pp. 1055-1058.

Tsunemine, Y. et al. Pt/BaxSr(1-x)TiO3/Pt Capacitor Technology for 0.15 micron Embedded Dynamic Random Access Memory. Jap. J. Appl. Phys. vol. 43 No. 5A (2004) 2457-2461.

Vest, R.W. Metallo-organic decomposition (MOD) processin of ferroelectric and electro-optic films: A review. Ferroelectrics, 102:1, 53-68.

Viviani, M. et al. Positive Temperature Coefficient of Electrical Resistivity below 150k of Barium Strontium Titanate. J. Amer. Ceram. Soc. vol. 87 (2004) 756-758.

Weily, A.R. et al. Antennas Based on 2-D and 3-D Electromagnetic Bandgap Materials. © 2003 IEEE pp. 847-850.

Yang, H-Y. D. et al. Surface Waves of Printed Antennas on Planar Artificial Periodic Dielectric Structures. IEEE Transactions on Antennas and Propagation 49(3). Mar. 2001. pp. 444-450.

Andrenko, A.S. et al. EM Analysis of PBG Substrate Microstrip Circuits for Integrated Transmitter Front End. MMET 2000 Proceedings pp. 295-297.

Bardi, I. et al. Plane Wave Scattering From Frequency-Selective Surfaces by the Finite-Element Method. IEEE Transactions on Magnetics 38(2) Mar. 2002. pp. 641-644.

Chappell, W. et al. Composite Metamaterial Systems for Two-Dimensional Periodic Structures. © 2002 IEEE pp. 384-387.

Cheng, Y.L. et al. Preparation and Characterization of (Ba.Sr)TiO3 thin films using interdigital electrodes. Microelectronic Engineering vol. 66 (2003) 872-879.

Clavijo, S. et al. Design Methodology for Sievenpiper High-Impedance Surfaces: An Artificial Magnetic Conductor for Positive Gain Electrically Small Antennas. IEEE Transactions on Antennas and Propagation 51(10). Oct. 2003. pp. 2678-2690.

Diaz, R. et al. Magnetic Loading of Artificial Magnetic Conductors for Bandwidth Enhancement. © 2003 IEEE pp. 431-434.

Hansen, R.C. Effects of a High-Impedance Screen on a Dipole Antenna. IEEE Antennas and Wireless Propagation Letters vol. 1 2002 pp. 46-49.

Joshi, P.C. et al. Processing and Characterization of Pure and Doped Ba0.6Sr0.4TiO3 thin films for tunable microwave applications. Mat. Res. Soc. Symp. Proc. vol. 656E (2001) DD4.9.1-DD4.9.6.

Kern, D.J. et al. Active Negative Impedance Loaded EBG Structures for the Realization of Ultra-Wideband Artificial Magnetic Conductors. © 2003 IEEE pp. 427-430.

Kern, D.J. et al. The Synthesis of Metamaterial Ferrites for RF Applications Using Electromagnetic Bandgap Structures. © 2003 IEEE pp. 497-500.

Kern, D.J. et al. Ultra-thin Electromagnetic Bandgap Absorbers Synthesized via Genetic Algorithms. © 2003 IEEE pp. 1119-1122.

Khun, R. et al., Characterization of Novel Mono- and Bifacially Active Semi-Transparent Crystalline Silicon Solar Cells, IEEE Transactions on Electron Devices, 46(10), Oct. 1999, p. 2013-2017.

Kretly, L.C. et al. The Influence of the Height Variation on the Frequency Bandgap in an AMC Artificial Magnetic Conductor for Wireless Applications: an EM Experimental Design Approach. Proceedings SBMO/IEEE MTT-S IMOC 2003 pp. 219-223.

Lee, Y. et al. Investigation of Electromagnetic Bandgap (EBG) Structures for Antenna Pattern Control. © 2003 IEEE, pp. 1115-1118.

Zhang, Y. et al. Planar Artificial Magnetic Conductors and Patch Antennas. IEEE Transactions on Antennas and Propagation 51(10). Oct. 2003. pp. 2704-2712.

Ziroff, A. et al. A Novel Approach for LTCC Packaging Using a PBG Structure for Shielding and Package Mode Suppression. $33^{rd}$ European Microwave Conference—Munich 2003 pp. 419-422.

* cited by examiner

| Component | Conventional CDMA | | | | Narrow Conductance Band Antenna | | | |
|---|---|---|---|---|---|---|---|---|
| | RF Input Power | Power Lost | DC Input Power | Wasted Power | RF Input Power | Power Lost | DC Input Power | Wasted Power |
| Secondary Band Filter | 1 mW | 1 mW | | 1 mW | 1 mW | — | | — |
| Power Amplifier (PA) | 1 mW | -506 mW | 1267 mW | 761 mW | 1 mW | -250 mW | 629 mW | 379 mW |
| PA/Duplexer matching | 507 mW | 23 mW | | 23 mW | | — | | — |
| SAW Duplexer | 484 mW | 212 mW | | 212 mW | | — | | — |
| Coupler | 272 mW | 6 mW | | 6 mW | | — | | — |
| Band Select Switch | 266 mW | 15 mW | | 15 mW | | — | | — |
| Power to Antenna | 251 mW | | | | 251 mW | — | | |
| | | | | 1018 mW | | | | 379 mW |

TABLE 1.

FIG. 5

R.F. ENERGY COLLECTION CIRCUIT FOR WIRELESS DEVICES

CROSS REFERENCE TO RELATED APPLICATIONS

This application claims priority from U.S. Provisional Patent Application Ser. No. 61/187,687, filed Jun. 17, 2009, entitled EXTENDED RANGE PASSIVE RFID SYSTEM and incorporated herein by reference in its entirety.

FIELD OF THE INVENTION

The present invention relates generally to the application of ideal materials sets and frequency-selective antennas to collect R.F. energy and to greatly extend the range of passive radio-frequency identification (RFID) systems.

BACKGROUND OF THE INVENTION

U.S. Pat. No. 6,027,826 to de Rochemont, et al. discloses articles and methods to form oxide ceramic on metal substrates to form laminate, filament and wire metal-ceramic composite structures using liquid aerosol spray techniques. U.S. Pat. Nos. 6,323,549 and 6,742,249 to de Rochemont, et al. disclose articles that comprise, and methods to construct, an interconnect structure that electrically contacts a semiconductor chip to a larger system using at least one discrete wire that is embedded in amorphous silica ceramic, as well as methods to embed passive components within said interconnect structure. U.S. Pat. Nos. 5,707,715 and 6,143,432 to de Rochemont, et al. (the '715 and '432 patents) disclose articles and methods to relieve thermally-induced mechanical stress in metal-ceramic circuit boards and metal-ceramic and ceramic-ceramic composite structures. U.S. Pat. No. 6,027,826 to de Rochemont, et al. disclose articles and methods to form oxide ceramic on metal substrates to form laminate, filament and wire metal-ceramic composite structures using liquid aerosol spray techniques. U.S. Pat. Nos. 6,323,549 and 6,742,249 to de Rochemont, et al. disclose articles that comprise, and methods to construct, an interconnect structure that electrically connects a semiconductor chip to a larger system using at least one discrete wire that is embedded in silica ceramic, as well as methods to embed passive components within said interconnect structure. U.S. patent application Ser. No. 11/479,159 (U.S. Pub. No. 2007/0003781) (hereinafter "de Rochemont '159") discloses articles and methods that laminate passive components (resistors, capacitors, inductors) on an exposed or a buried microelectronic surface using liquid aerosol sprays or inkjet deposition systems. U.S. patent application Ser. No. 11/660,042 (Pub. No. 2007/0139976) (hereinafter "de Rochemont '042) discloses articles and methods that laminate passive components on an exposed surface layer or a buried microelectronic layer to form a power management device using laminated resistors, capacitors, inductors or transformers. U.S. Pat. No. 7,405,698 is used to miniaturize artificial magnetic conducting ground planes and form meta-material dielectrics that, in combination with de Rochemont '159, enable electrically small antennas. The contents of each of these references are incorporated herein by reference as if laid out in their entirety.

RFID systems allow an object to be remotely identified by a radio frequency "interrogator" signal, which activates a "chirp" or "read" signal from the RFID tag. Passive RFID systems do not have any internal power sources (such as battery elements) within the tag to avoid maintenance needs and, consequently, will have read ranges—(the distance from which the tag can be remotely identified)—limited to 65 to 100 feet. This is the case because the interrogator signal must activate and power the "read signal" from the RFID transponder. Therefore, the interrogator signal must be powerful to simultaneously overcome signal path losses between the read head and the RFID tag, to activate the "read" signal, and still be detectable by the remote read head. State-of-the-art passive RFID systems that incorporate surface-acoustic wave systems will require power levels of −15 dB to −18 dB simply to activate the chirped read signal.

RFID systems are used to manage assets in inventory and during transport. Recently, piracy and theft during logistical transport has developed a need for passive RFID sensors that can not only report asset location, but additional information that might indicate whether or not the asset has been compromised or tampered to a surveillance vehicle located several miles away from the asset, such as an unmanned aerial vehicle.

Therefore, methods that enable passive RFID sensors to remotely report the location or tampering of an asset at distances up to and exceeding a distance of 10 miles is desirable. It is also desirable that such an RFID system have a planar structure so that it may be concealed in the wall of a container to protect it from being detected, damaged or destroyed prior to or during the time an asset is tampered.

SUMMARY OF THE INVENTION

One embodiment of the present invention provides an R.F. energy collection circuit, comprising a low-loss R.F. front end tuned to minimize lost power in R.F. bands commonly used for communications for passing substantially coherent R.F. signals received therefrom, a rectifier circuit coupled to receive coherent R.F. energy from the front end, and an energy storage circuit coupled to receive energy from the rectifier circuit.

The storage circuit may include a tank circuit. The storage circuit may include a rechargeable battery. The rectifier circuit may include a center-tapped transformer.

The R.F. front end may include a folded dipole antenna formed in composite material having an effect permittivity which varies $\leq 5 \times 10^{-2 \circ} C.^{-1}$. The effective permittivity of the composite material may be made to vary $\leq 9 \times 10^{-3 \circ} C.^{-1}$.

The circuit may further comprise an RFID circuit coupled to receive response transmission energy from the energy storage circuit. The RFID circuit may include an interrogation reception circuit and an ID transmission circuit, and further wherein the interrogation reception circuit is coupled to connect energy from the energy storage circuit to power the ID transmission circuit in response to an interrogation signal being received by the interrogation reception circuit.

The circuit may further comprise a wireless appliance coupled to receive power from the energy storage circuit.

The present invention describes methods and embodiments that extend the read range of easily concealable passive RFID sensor systems by minimizing activation energies and harvesting power from the RF environment.

An RFID circuit generally includes a stray RF energy collection circuit, an storage device for the collected stray RF energy, an ID transmission circuit and an interrogation reception circuit adapted for coupling stored energy to the ID transmission circuit in response to an interrogation signal sent to the RFID circuit. The energy collection circuit may have resonant antenna sections tuned to frequencies used for global communications and navigation. Narrow conductance band frequency-selective antenna tuning may be used for the interrogator-receive and tag transmit circuits, and also for the read-head antenna system that interrogates the RFID circuit. Meta-material dielectrics may be used to apply the aforementioned antenna turnings to electrically small antennas embedded within the meta-material dielectric. The ID transmit circuitry may optionally include an oscillator, a power amplifier, and modulation circuitry that encodes specific information about the status of an asset associated with the RFID circuit for transmission back to the remote read head.

BRIEF DESCRIPTION OF THE DRAWINGS

For a better understanding of the present invention, together with other and further aspects thereof, reference is made to the following description taken in conjunction with the accompanying figures of the drawing, wherein.

DETAILED DESCRIPTION OF THE INVENTION

The read range of an RFID device, passive or otherwise, is determined by the residual power detectable in dBWatts (dBW) at the remote read head, $P_r$, which is determined by:

$$P_r = P_t - L_p + G_t + G_r - L_t - L_r, \quad (1)$$

where $P_t$ is the radio frequency (RF) power transmitted by the RFID tag, $L_p$ is the signal path loss, $G_t$ and $G_r$ are the antenna gain of the RFID tag (t) and the remote read head (r) respectively, $L_t$ and $L_r$ represent the transmission line losses between the transmitter circuit and the tag antenna and the read antenna and the read head receiver circuitry, with all values reported in dBW except for the antenna gains which are reported in dBi. The free space signal path loss is determined by:

$$L_p = 36.6 + 20 \log(f[\text{MHz}]) + 20 \log(d[\text{miles}]), \quad (2)$$

where f is the signal frequency in megahertz units (MHz) and d is the distance in units of miles. Therefore, at a distance of 10 miles the free space path loss for a 900 MHz signal is significant (~116 dBW). Signal loss due to scattering and attenuation caused by features in the landscape and buildings can easily drive path loss values up to 140-160 dBW, which makes the task of remotely detecting the RFID tag quite challenging.

In order to extend the range of remote RFID devices it therefore is essential to increase the transmitted power at the RIFD tag ($P_t$), increase the gain of the tag and read head antennas ($G_t$) and ($G_r$), respectively, and minimize the transmission line losses in the interconnects placing the transmission circuitry in electrical communication with the tag antenna ($L_t$), and the receiver circuitry in electrical communication with the receive antenna ($L_r$). As described in the background, the present invention provides a means to minimize transmission line losses ($L_t$ and $L_r$) by embedding low resistivity alloys or noble metals (copper, silver or gold) in amorphous silica glass ceramic, which is used in optical fiber applications for its ultra-low dielectric loss (tan $\delta \approx 2 \times 10^{-5}$).

A limitation to state-of-the-art passive RFID tags is that the interrogator signal is used to activate and power the chirp signal. At a distance of 10 miles, the power of a 900 MHz interrogator signal is already reduced by −116 dBW (in free space). If it requires −15 dBW to −18 dBW to activate the transmitted read signal, the total loss (assuming no transmission line losses i.e., $L_t$ and $L_r$=0) for the round trip is −247 dBW to −250 dBW. This level of loss makes it extremely difficult to operate a passive RFID system, particularly if the interrogator signal powers the chirp signal. This limitation is overcome by the current invention.

Figure 1:
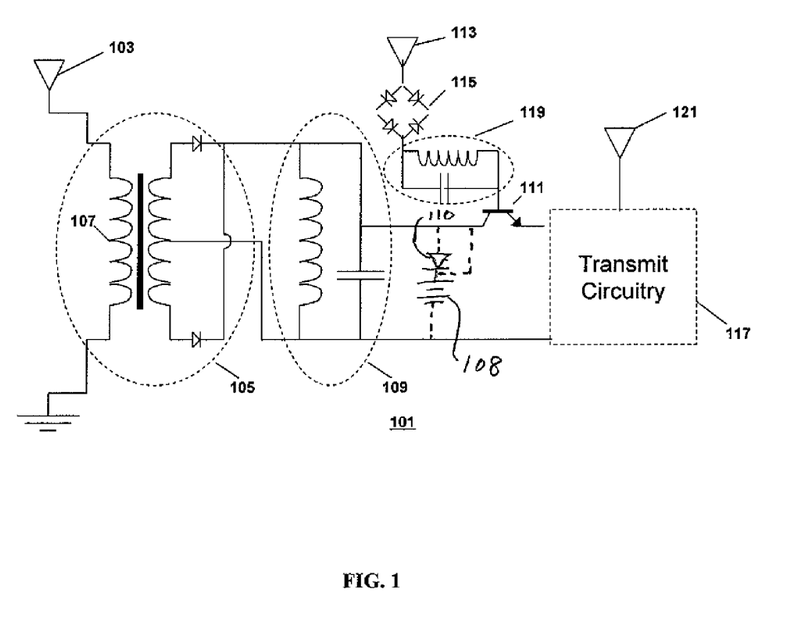
FIG. 1 is a schematic representation of an extended range passive RFID architecture that harvests energy from the RF environment to power the signal sent to the remote interrogator.
Figure 2:
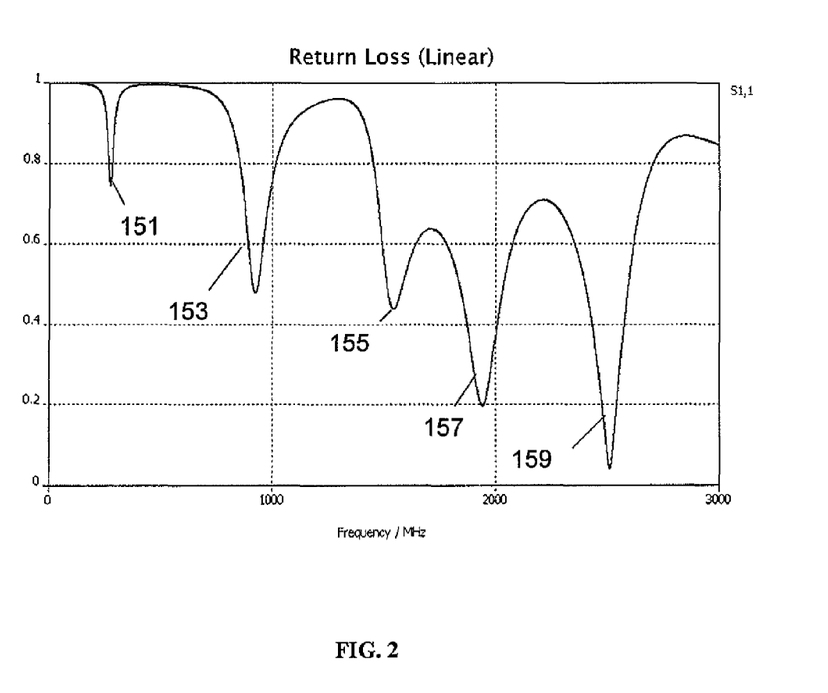
FIG. 2 depicts the return loss of a broadband antenna element that is tuned to selectively absorb energy from signals commonly found in the modern RF environment.

Reference is now made to FIGS. 1 & 2 which depict features of the present invention. The extended range passive RFID 101, shown in FIG. 1, uses a selective-frequency broadband antenna system 103 to harvest ambient power from the RF environment. The antenna system is a dipole antenna folded in such a way that current vectors along the dipole arms form capacitive loads (when aligned in anti-parallel directions) and inductive loads (when aligned in parallel directions). By properly folding the arms one can construct one or more RF filtering stages by inserting capacitive and inductive load elements in series or in parallel to create frequency selective pass bands. Further details of this method and technology are described in U.S. Provisional Patent Application Ser. No. 61/355, 755, filed Jun. 17, 2010 and entitled FREQUENCY SELECTIVE DIPOLE ANTENNAS, the contents of which are hereby incorporated by reference herein.

FIG. 2 shows the selective frequency response of a folded dipole that is designed to be resonant at the primary frequencies for civilian communications and navigation, with resonant frequencies at the 450 MHz cellular band 151, the 900 MHz bands used for the American Mobile Phone System (AMPS) bands 153, the 1600 MHz global positioning satellite (GPS) bands 155, the 1800 MHz and 1900 MHz global system mobile (GSM) bands 157, and the 2.5 GHz (2500 MHz) WiFi bands 159. This selective-frequency broadband antenna system 103 allows the passive RFID system 101 to harvest energy from the RF environment that is readily available from the civilian wireless communications infrastructure. The selective-frequency broadband antenna need not be tuned to these frequencies, and can be tuned to an arbitrary set of frequencies that could readily harvest power from any given RF environment. These bands are cited here because they are widely used in the global civilian communications infrastructure and can readily supply RF power to the passive tag in most locations around the world.

The RF power harvested by selective-frequency broadband antenna element 103 is then fed through a rectification circuit 105, which may either be a diode bridge or a center-feed transformer 107 as shown in FIG. 1, which stores the energy in a lumped circuit (LC) storage tank 109. The LC storage tank 109 may comprise one or more inductor coils, capacitor and/or resistor elements, or may comprise any device that is capable of storing the harvested RF power for later use. This energy harvested from the RF environment is now available to augment the power of the transmitted signal $P_t$ from the passive RFID tag, which is needed to extend its read range.

Alternatively to the RF ID circuit shown in fig one, the energy collection and storage circuitry described thus far in components 103, 105, 107 and 109 may be used for providing power to any sort of wireless device or appliance. This includes, but is not limited to cell phones, computing devices, GPS devices, pagers, radios, etc. For this purpose, it may be desirable to include a rechargeable battery 108 and diode 110, connected in phantom, to store power either from storage tank 109 or directly from rectifier 105.

Figure 3A:
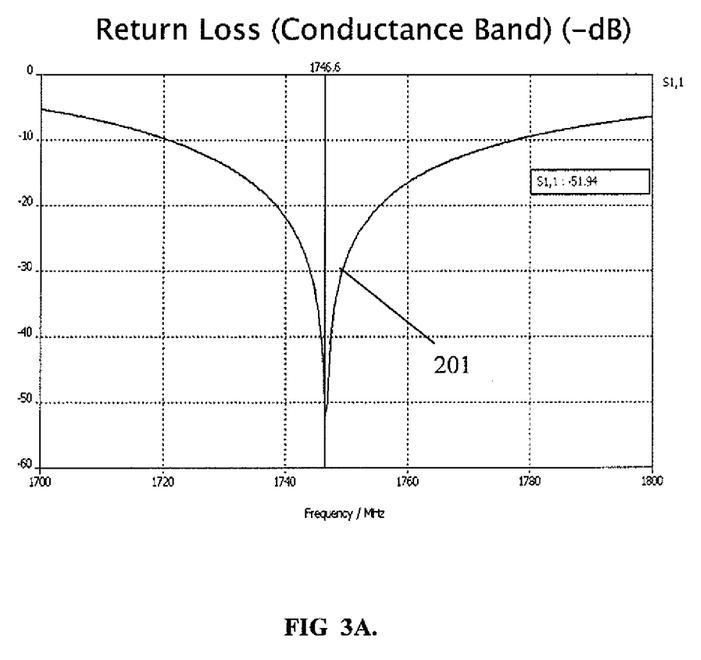
FIG. 3 depicts the return loss of narrow conductance band antenna that eliminates the need for additional RF filtering stages in the RFID tag or the read head.
Figure 3B:
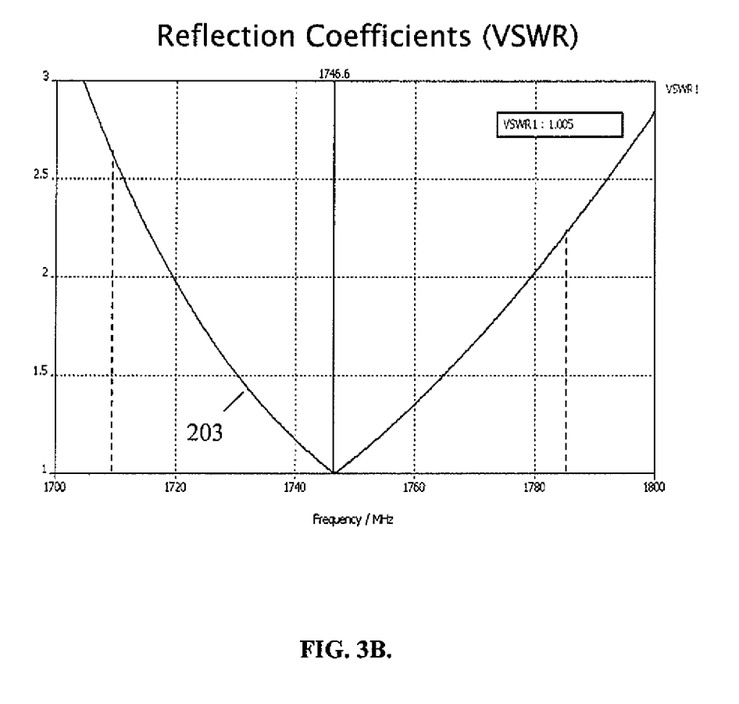

As referenced above and in the background, conventional passive RFID systems rely on the interrogator signal to both activate and supply the power for the transmitted chirp signal. At long distances, such as 10 miles or more, the interrogator power is already diminished by signal path losses, so a −15 dBW to −18 dBW loss associated with activating the chirp signal is highly undesirable. It is therefore a desirable embodiment of the present invention to utilize a weak interrogator signal to activate a switch 111 that dumps the harvested and stored RF power into the transmit circuitry of the extended range passive RFID system 101. Reference is now made to FIGS. 1, 3A, 3B and Table 1 of FIG. 5 to illustrate preferred embodiments of the invention to maximize performance in this regard. The tag's interrogator-receive antenna 113 registers the interrogator signal, which it then passes through a rectifier circuit 115. Rectifier circuit 115 is representational in FIG. 1 and may be a center-feed transformer or a rectifying diode bridge. The interrogator-receive circuitry may additionally contain command circuitry (not shown) that may receive digitally encoded instructions to alter the modulation encoding (also not shown) in the RFID system's 101 transmit circuitry 117 to communicate information about the asset, such as maximum exposed temperatures, applied g-forces, or evidence of tampering. The weak interrogator is then used as a base current for a power transistor that functions as the switch 111. The LC storage tank 109 supplies both the collector voltage $V_c$ and the collector $I_c$ for the switch 111, while the rectified weak interrogator signal provides base current for the switch 111. Since gain for the switch 111 is a function of the base current derived from the weak interrogator signal, it may be desirable for the interrogator-receive circuit to also contain a power management or collection system 119 that allows the base current supplied to the switch 111 to obtain a threshold value that maximizes the transmitted power $P_t$ from the extended range passive RFID system. The emitter current and voltage emerging from the switch 111 is then used to power the transmit circuitry 117 that may optionally include an oscillator, a power amplifier, and modulation circuitry that encodes specific information about the asset's status for transmission back to the remote read head.

As alternatively referred to above, the representational transmit circuitry 117 may also be embodied by any form of wireless device or appliance such as cell phones, computing devices, GPS devices, pagers, radios, etc. while components 103, 105, 107 and 109 work as a recharging and power supply.

As noted above, it is desirable to minimize transmission line losses in the tag and the read head. This may also include RF front-end losses from filters that are used to improve overall signal integrity in the system. To this end, it is a preferred embodiment of this invention to utilize antenna elements that have been tuned to have narrow conductance band frequency selectivity as shown in FIGS. 3A, 3B using the current vector alignment methods described above. In this instance, the RF filtering stages built in to the folded dipole antenna limit the resonant band of the interrogator-receive antenna 113 and the transmit antenna 121 to a narrow communications band 201 of signal frequencies. Since this antenna tuning provides a voltage standing wave ratios (VSWR) frequency 203 bandwidth that is much wider than the conductance bandwidth 201, this antenna tuning both filters spurious noise from the interrogator-receive antenna 113 and eliminates undesirable emissions from the transmit antenna 121.

Figure 5:
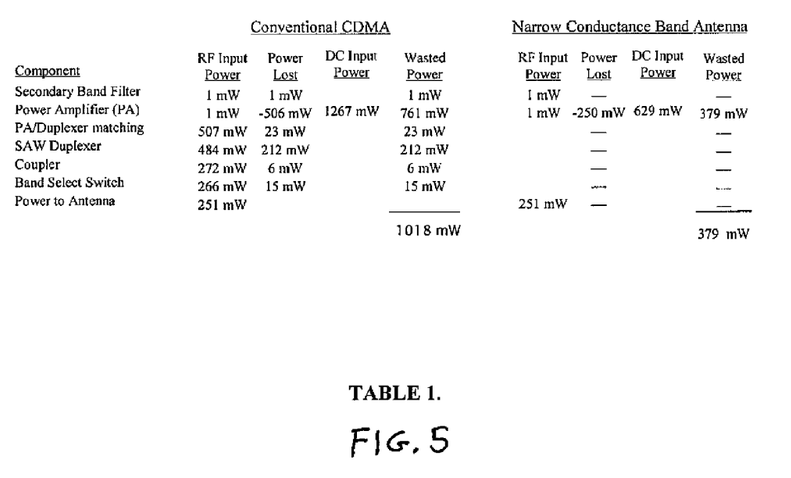
FIG. 5. shows TABLE 1, which compares the power losses in a conventional RF front-end used in code-division multiple access (CDMA) to the power losses in an RF front-end that contains a narrow conductance band antenna.

Table 1 provides an analysis of the power that is wasted in an RF front-end designed for code division multiple access (CDMA) communications using conventional filters to an RF front-end that uses a narrow conductance band antenna. Not only is there a 60% reduction in the power wasted through the front-end circuit, the resultant power savings additionally allow a power amplifier (PA) contained in the transmit circuitry 117 to operated at lower back-off voltage, which allows it to operate at much higher efficiency. It is therefore a preferred embodiment of the present invention to use narrow conductance band frequency-selective antenna tuning not just for the interrogator-receive and tag transmit circuits, but also for the read-head antenna system.

Signal path loss can be reduced by using a lower signaling frequency. For instance, 10-30 MHz signaling frequencies reduce the free space path loss from the tag to the receive head from −116 dBW to 74-80 dBW. Lower signaling frequencies consequently require antennas that are much larger in size to achieve higher efficiencies and high gain. This proportionally makes the device much larger in overall size. For the purpose of concealment, it is therefore advantageous to have a smaller device that operates at lower frequency and also has high gain and excellent power efficiency characteristics. It is therefore a preferred embodiment of the invention to use meta-material dielectrics that apply the aforementioned antenna turnings to electrically small antennas embedded within the meta-material dielectric.

Figure 4:
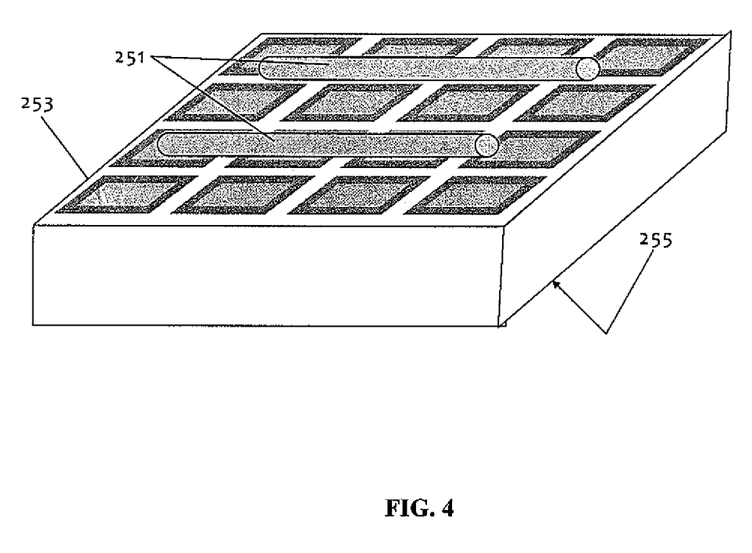
FIG. 4 depicts a physical design of a planar RFID device.

Finally, it is desirable that the present invention be easily concealable within a planar surface of the asset or its container. Reference is now made to FIG. 4 to describe a preferred embodiment of the invention in which the antenna systems 251 are configured on a thermally stable miniaturized artificial magnetic conducting (AMC) ground plane 253 that comprises high-energy ceramic meta-material dielectric. To improve system planarity it is also desirable to have all the additional circuit elements, such as the power transistors, diodes, passive components (transformers, inductors, capacitors, resistors)—(not shown in FIG. 4)—laminated on the backside 255 of said AMC ground plane 253 adjacent to any active semiconductor chip components that may be needed to complete the circuit.

All of the electronic components shown and represented in FIG. 1 may be optimally constructed using the techniques described in the patents and patent applications incorporated herein by reference.

Although the invention has been described with respect to various embodiments, it should be realized this invention is also capable of a wide variety of further and other embodiments within the spirit and scope of the present invention.

What is claimed is:

1. An extended range passive RFID transponder with an R.F. energy collection circuit, comprising:
   a first narrow conductance band antenna forming an interrogator receive antenna and in electrical communication with the gate electrode of a transistor switch,
   wherein the first narrow conductance band antenna comprises a folded dipole that is resonant at a frequency or frequencies that match the frequency or frequencies of an interrogator signal for the RFID transponder, providing −30 dB or better signal isolation from RF frequencies that do not match the frequency or frequencies of the interrogator signal,
   an ID transmission circuit;
   an R.F. energy collection circuit, comprising:
   a low-loss R.F. front end including a folded dipole antenna tuned to minimize lost power in two or more R.F. bands commonly used for communications for passing substantially coherent R.F. signals received therefrom;

wherein the low-loss R.F. front end comprises low-resistivity alloys or noble metals embedded in a composite material having an effective permittivity that varies $5\times10^{-2o}$ C.$^{-1}$;

a rectifier circuit coupled to receive coherent R.F. energy from the front end; and an energy storage circuit coupled to receive energy from the rectifier circuit and coupled to provide energy to the ID transmission circuit in response to an interrogation signal received by the first narrow conductance band antenna.

2. The transponder of claim 1, wherein the storage circuit includes a tank circuit.

3. The transponder of claim 1, wherein the storage circuit includes a rechargeable battery.

4. The transponder of claim 1, wherein rectifier circuit includes a center-tapped transformer.

5. The transponder of claim 1, wherein the effective permittivity of the composite material varies $<9\times10^{-3o}$ C.$^{-1}$.

6. The transponder of claim 1, wherein the ID transmission circuit is coupled to the R.F. energy collection circuit through the transistor having the gate electrode coupled to the first narrow conductance band antenna.

7. The transponder of claim 6, further comprising a resonant tank circuit connected between the first narrow conductance band antenna and the transistor gate electrode.

8. The transponder of claim 1, further comprising a wireless appliance coupled to receive power from the energy storage circuit.

9. The transponder of claim 1, wherein the folded dipole antenna is resonant in two or more separate R.F. bands.

10. The transponder of claim 1, wherein the energy storage circuit and the passive RFID system is functional without a battery.

* * * * *